United States Patent
Cholkeri et al.

[11] Patent Number: 5,715,704
[45] Date of Patent: Feb. 10, 1998

[54] REFRIGERATION SYSTEM FLOW CONTROL EXPANSION VALVE

[75] Inventors: Pandu R. Cholkeri, Worthington; Gary L. Russo, Delaware; Thomas W. Parker, Columbus, all of Ohio

[73] Assignee: Ranco Incorporated of Delaware, Wilmington, Del.

[21] Appl. No.: 678,553

[22] Filed: Jul. 8, 1996

[51] Int. Cl.⁶ .................. F25B 49/00; F25B 41/04
[52] U.S. Cl. .................. 62/527; 62/222; 137/513.3; 251/129.15
[58] Field of Search .................. 62/527, 528, 504, 62/222, 204, 205, 210, 211; 137/110, 513.3; 251/129.01, 129.02, 129.05, 129.15

[56] References Cited

U.S. PATENT DOCUMENTS

| | | |
|---|---|---|
| 920,392 | 5/1909 | Rider. |
| 2,922,292 | 1/1960 | Lange .................. 62/222 |
| 3,355,142 | 11/1967 | Kammerer, Jr. et al. |
| 3,367,130 | 2/1968 | Owens. |
| 3,482,415 | 12/1969 | Trask. |
| 3,587,641 | 6/1971 | Johnson. |
| 3,810,488 | 5/1974 | Orth et al. |
| 3,970,282 | 7/1976 | Hansen. |
| 4,009,592 | 3/1977 | Boerger .................. 62/222 |
| 4,190,231 | 2/1980 | Vimercati. |
| 4,193,781 | 3/1980 | Vogel et al. |
| 4,254,634 | 3/1981 | Akio et al. |
| 4,407,329 | 10/1983 | Huebsch et al. |
| 4,437,645 | 3/1984 | Nomura et al. |
| 4,459,819 | 7/1984 | Hargraves. |
| 4,523,436 | 6/1985 | Schedel et al. |
| 4,614,327 | 9/1986 | Valbjorn et al. |
| 4,632,358 | 12/1986 | Orth et al. |
| 4,788,828 | 12/1988 | Sato. |
| 4,793,591 | 12/1988 | Decker et al. |
| 4,817,667 | 4/1989 | Hagar. |
| 4,840,038 | 6/1989 | Sato. |
| 4,893,782 | 1/1990 | Franke. |
| 5,064,166 | 11/1991 | Schechter. |
| 5,341,656 | 8/1994 | Rust et al. .................. 62/324.6 |
| 5,402,652 | 4/1995 | Alsenz .................. 62/222 |

*Primary Examiner*—William Doerrler
*Attorney, Agent, or Firm*—Watts, Hoffmann, Fisher & Heinke Co., L.P.A.

[57] ABSTRACT

A refrigeration system including a flow control expansion valve. A valve body defines a valve inlet for accepting refrigerant and a valve outlet for delivering refrigerant that has passed through the valve body. A metering head defines first and second passageways for fluid passing through the valve body. A cylindrical sleeve is mounted for controlled movement within the valve body and including a center passageway which in combination with the first and second passageways conveys fluid through the valve body to the valve outlet. A spring urges the sleeve in a direction relative the metering head to maintain both the first and second passageways in fluid communication with the center passageway of the sleeve. A valve actuator mounted to the valve body moves the sleeve against the biasing action of the spring to restrict flow through one passageway of the first and second passageways while allowing fluid to flow through another of the first and second passageways and said center passageway of said sleeve to the outlet. The valve actuator includes a control input responsive to an external control signal to initiate movement of the sleeve to a position for restricting flow through said one passageway.

33 Claims, 3 Drawing Sheets

REFRIGERATION SYSTEM FLOW CONTROL EXPANSION VALVE

FIELD OF THE INVENTION

This invention relates to refrigeration systems and more particularly to a refrigeration system employing a refrigerant flow control valve.

BACKGROUND ART

A representative refrigeration system with which the present invention can be used is a motor vehicle air conditioning system, but it is appreciated that the invention has utility in other refrigeration systems. Such a system utilizes an engine driven semi-hermetic compressor connected in series with a condenser, evaporator, and a refrigerant flow control valve (sometimes referred to as an expansion valve) between the condenser and the evaporator. Gaseous refrigerant is compressed by the compressor and then passes through the condenser. Within the condenser the highly pressurized refrigerant condenses as it gives up heat to the environment. In an air conditioning system the condenser gives up heat to the ambient environment outside the motor vehicle.

The liquid refrigerant that exits the condenser next passes through an expansion valve that allows the compressed refrigerant to experience a sudden drop in pressure causing it to cool and expand, returning to a gaseous state as it gathers heat by flowing through the evaporator. In a motor vehicle air conditioning system, a fan or blower forces air across the evaporator where the air is cooled, and delivers that air to a passenger compartment of the motor vehicle.

U.S. Pat. No. 4,459,819 to Hargraves describes a prior art electronically controlled expansion valve. The expansion valve described in the Hargraves patent is most preferably an on/off (open/closed) direct controlled solenoid valve. The valve is periodically energized (opened) and de-energized (closed) in response to a refrigeration system parameter such as superheat, i.e. the temperature difference of the refrigerant entering and exiting the refrigeration system evaporator.

DISCLOSURE OF THE INVENTION

The present invention concerns a refrigeration expansion valve having a fully opened state which provides a maximum refrigerant flow through the valve and a second restricted state which provides a lesser amount of refrigerant flow through the valve.

A refrigeration system that incorporates the present invention has a compressor, evaporator and condensor connected in series for the delivery of refrigerant through the system. An expansion valve for delivering refrigerant from the condensor to the evaporator controls the refrigerant flow. In accordance with one embodiment of the invention the expansion valve includes a valve body having a valve inlet for accepting refrigerant and a valve outlet for delivering refrigerant that has passed through the valve body. The valve body includes a metering head that defines first and second passageways for fluid passing through the valve body.

A valving element is mounted for controlled movement within the valve body and includes a valve element passageway which in combination with the first and second passageways in the metering head conveys fluid through the valve body to the valve outlet. A valve actuator mounted to the valve body moves the valving element to a position for restricting refrigerant flow through one passageway of the first and second passageways while allowing refrigerant to flow through another of the first and second passageways. The valve actuator includes a control input responsive to an external control signal to control positioning of the valving element.

The nature of the signal at the control input depends upon the manner in which refrigeration flow is regulated. In certain applications it is sufficient to regulate flow between high and low flow rates at periodic intervals based upon a monitored parameter. In the example of a motor vehicle air conditioning system the monitored parameter could be engine speed, motor vehicle speed, or compressor head pressure. Any of these going below a threshold value could be used to control refrigerant flow rates. In other applications a controlled frequency pulse width modulated signal could be applied at the control input. In such an application a greater control over refrigerant flow is required and by controlling the duty cycle of the control signal a greater degree of control over refrigerant flow is maintained.

These and other objects, advantages and features of the present invention will be understood by a review of a detailed description of one embodiment of the invention which is described in conjunction with the accompanying drawings.

BEST MODE FOR PRACTICING THE INVENTION

Figure 1:
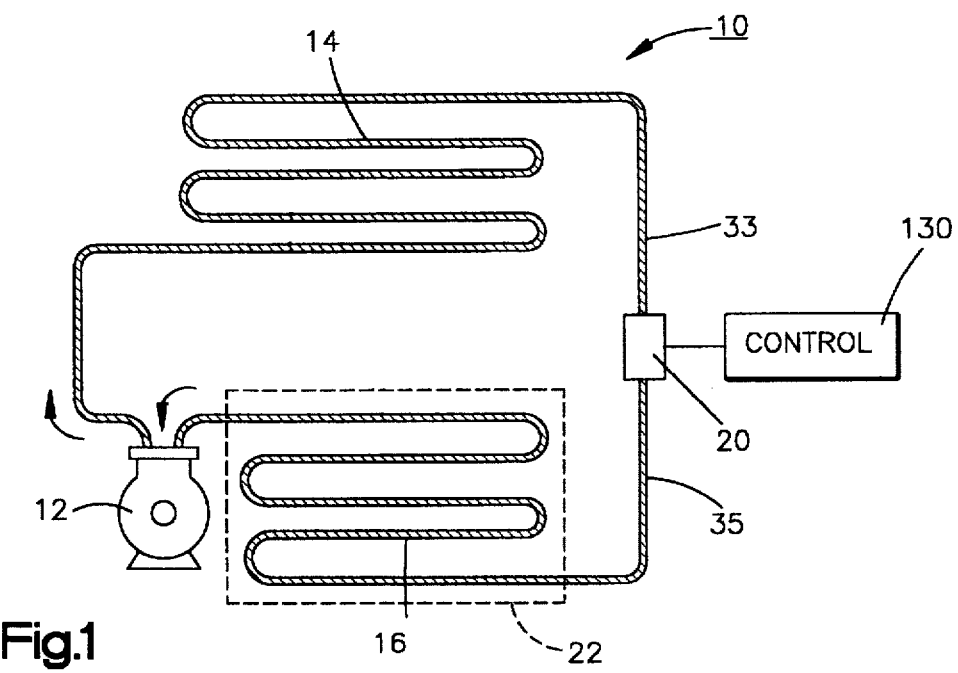
FIG. 1 is a schematic representation of a refrigeration system embodying a refrigerant flow control valve constructed according to the present invention.

A vapor compression refrigeration system 10 of the sort used in a motor vehicle air conditioner is schematically illustrated in FIG. 1. The system 10 is a hermetic circuit containing a refrigerant such as R134A. The system 10 comprises a compressor 12, a condenser 14, an evaporator 16, and a flow controlling valve 20 between the condenser and the evaporator.

The compressor circulates the refrigerant through the system 10 so that heat is transferred from an interior of a motor vehicle 22 to the atmosphere outside the motor vehicle as the refrigerant successively evaporates and condenses in the evaporator and condenser. A temperature sensor (not illustrated) provides temperature signals for controlling operation of the refrigeration system to maintain the passenger compartment within desired temperature limits.

The compressor 12 compresses gaseous refrigerant flowing from the evaporator 16 and delivers it, at an elevated temperature, to the condenser 14. The condenser transfers heat from the refrigerant flowing through it to atmospheric air so that the refrigerant condenses in the condenser. Liquified refrigerant flows from the condenser through the expansion valve 20 after which it enters the evaporator 16, having undergone a substantial pressure reduction.

The system geometry is such that the liquified refrigerant collects at the discharge end of the condenser 14 before entering the expansion valve 20. The expansion valve 20 controls refrigerant flow to the evaporator to alter the refrigeration effect provided by the system.

A quantity of the liquified refrigerant, substantially at the compressor discharge pressure, tends to accumulate at the downstream condenser end when the compressor is operating. The condenser 14 continues to transfer heat away from this liquified refrigerant so its temperature drops below the condensation temperature corresponding to the condenser pressure. This refrigerant condition is known as "subcooling." The extent of the subcooling depends upon various system operating conditions.

The refrigerant flow controlling expansion valve 20 varies the refrigerant flow rate from the condenser to the evaporator according to refrigeration system operating parameters to assure efficient operation. The illustrated flow controlling valve 20 regulates refrigerant flow into the evaporator between a first minimum flow condition and a second maximum flow condition.

Figure 2:
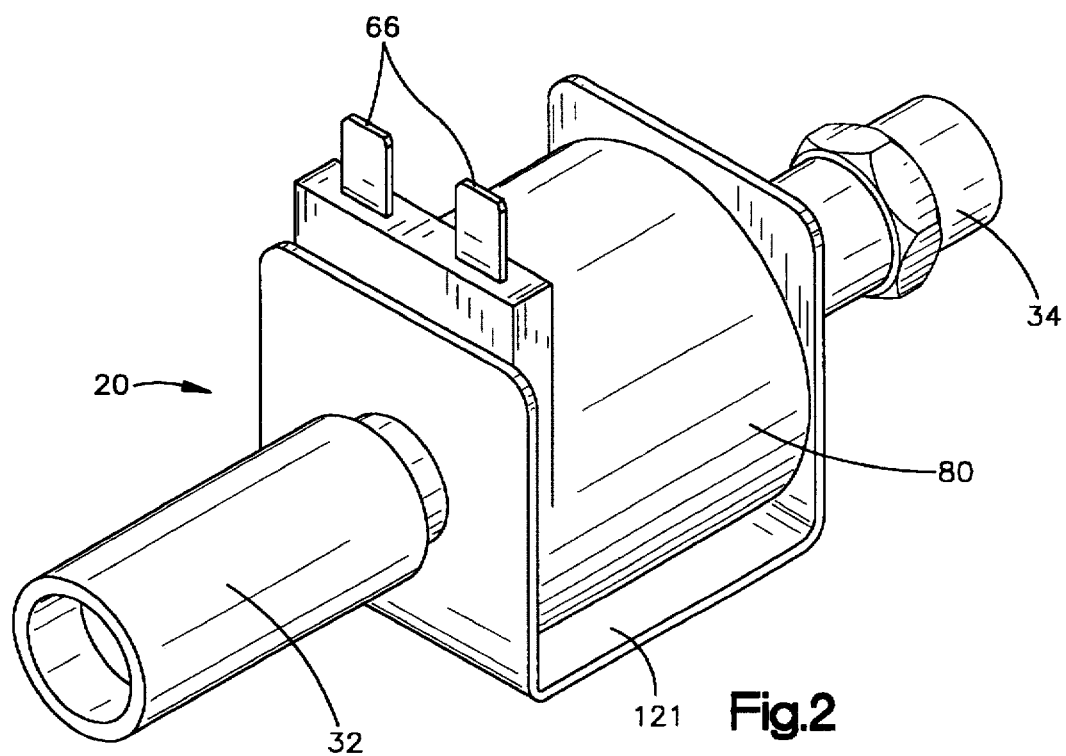
FIG. 2 is a perspective view of a preferred refrigerant flow controlling valve constructed in accordance with the present invention.
Figure 3:
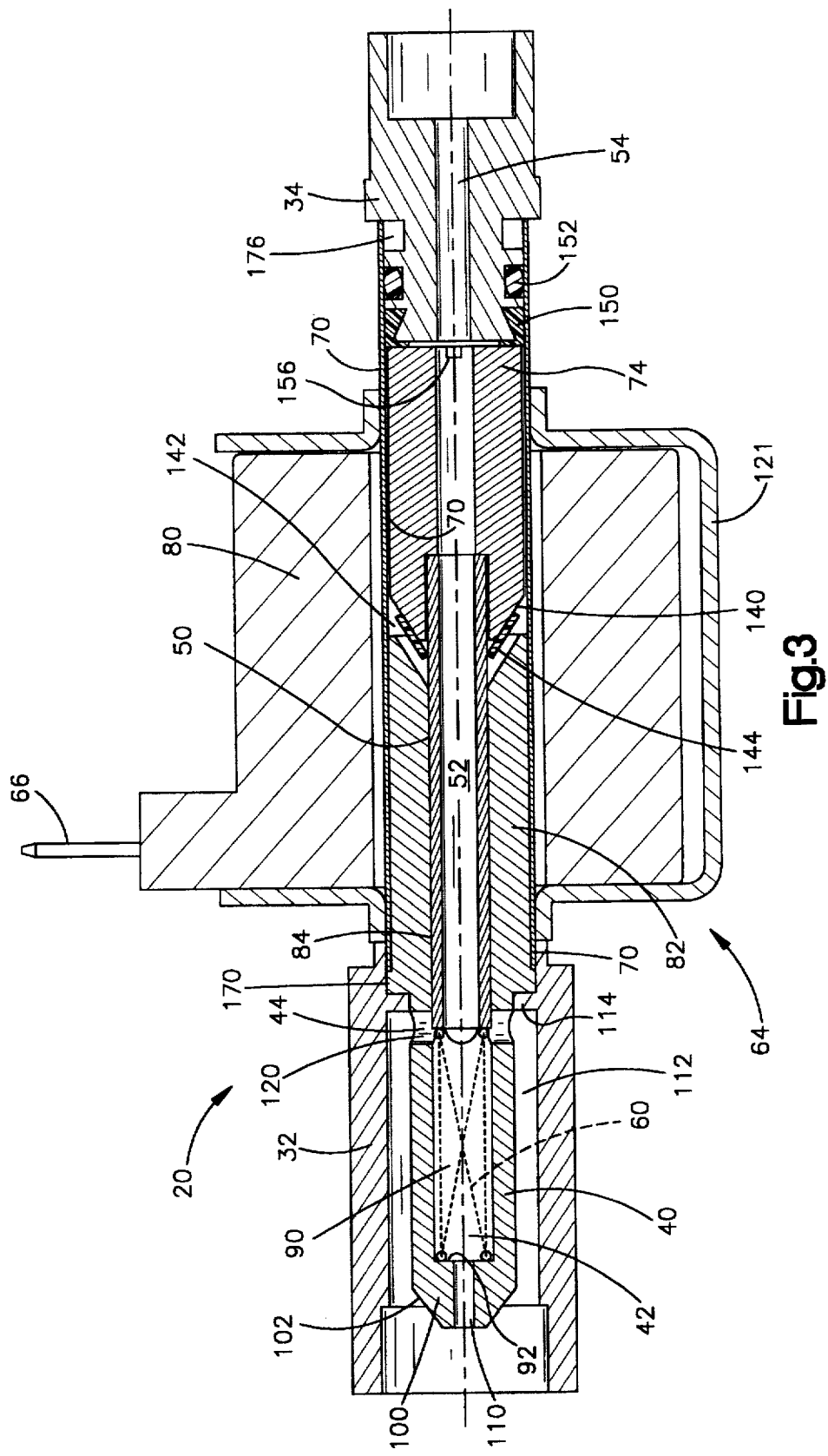
FIG. 3 is a cross sectional view of a preferred refrigerant flow controlling valve constructed according to the present invention.
Figure 4:
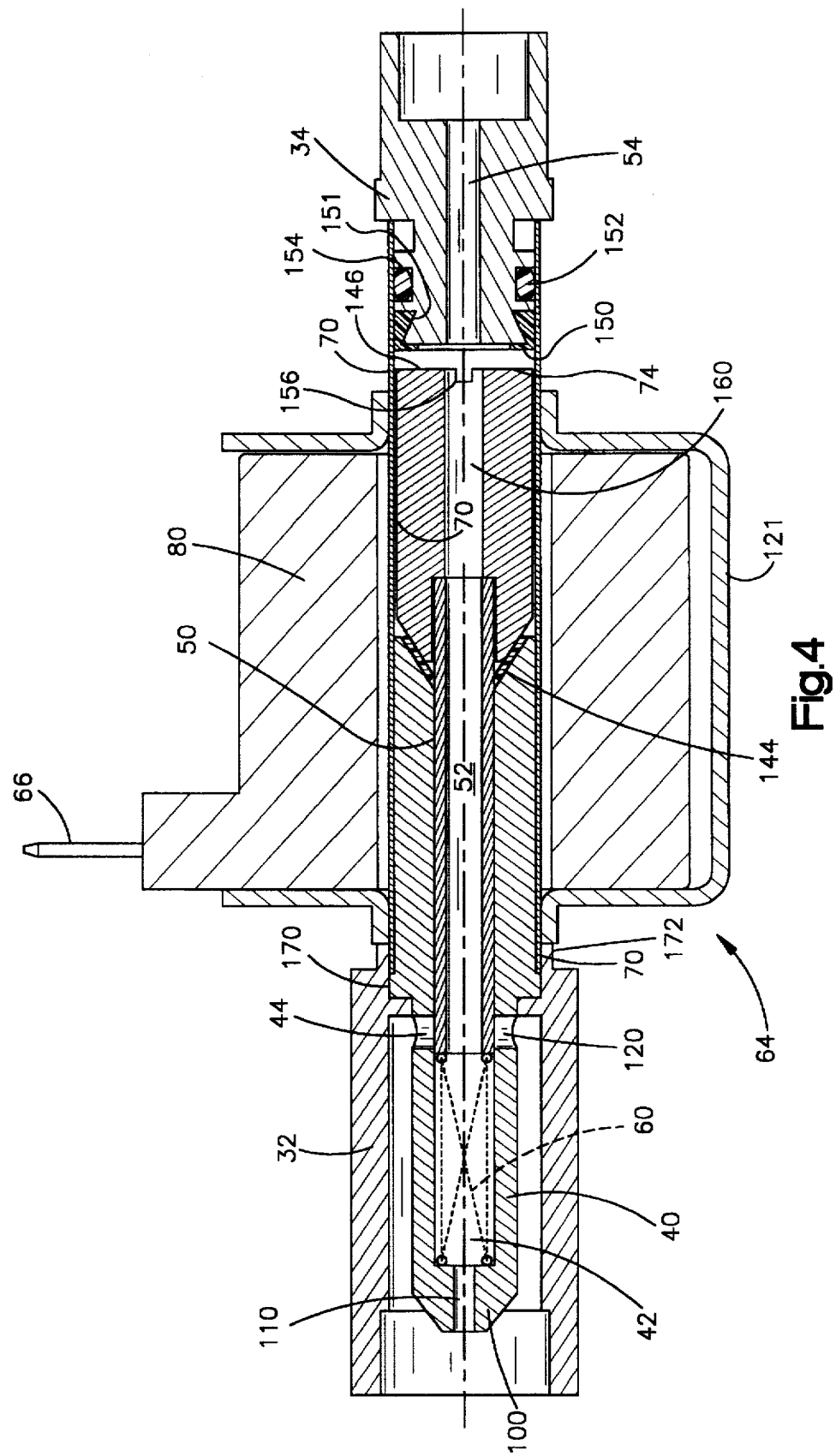
FIG. 4 is a cross sectional view of a preferred refrigerant flow controlling valve with a valve actuator moved to a flow restricting position.

The preferred valve 20, illustrated in FIGS. 2–4, is particularly adapted for use in a motor vehicle air conditioning system. The expansion valve 20 includes a valve body having a valve inlet 32 adapted for connection to a conduit 33 that delivers refrigerant from the condenser and a valve outlet 34 adapted for connection to a conduit 35 for delivering refrigerant that has passed through the valve 20 to the evaporator. The valve body supports a metering head 40 that defines first and second passageways 42, 44 for regulating refrigerant flow through the valve 20.

A valving element, which most preferably is an elongated generally cylindrical sleeve 50, is mounted for controlled movement within the valve body and defines a center passageway 52 which in combination with the first and second passageways 42, 44 conveys refrigerant through a passageway 54 in the valve outlet 34. A biasing member 60, which is preferably a compressed spring, urges the sleeve 50 in a direction relative the metering head 40 to maintain both the first and second passageways 42, 44 in fluid communication with the center passageway 52 of the sleeve 50.

A valve actuator 64 is mounted to the valve body and moves the sleeve 50 against the biasing action of the spring 60 to restrict flow through one passageway 44 of the first and second passageways while allowing fluid to flow through another passageway 42 of the first and second passageways. The valve actuator 64 includes a control input 66 that responds to an externally generated control signal to initiate movement of the sleeve 50 to a position for limiting or restricting refrigerant flow through the passageway 44.

As seen in the drawings, the valve body includes an elongated generally cylindrical metal housing 70 that connects the valve inlet 32 and the valve outlet 34 and surrounds a generally cylindrical internal cavity. The valve actuator 64 includes a movable magnetic member 74 that moves the sleeve 50 and which is supported by an inner surface of the housing 70. The moveable magnetic member 74 responds to controlled energization of a solenoid coil 80 by moving the sleeve 50 against the biasing action of the spring 60. The solenoid coil 80 is electrically coupled to a control input 66 which energizes the solenoid coil and sets up a magnetic field in the region of the moveable magnetic member 74. In accordance with the disclosed embodiment of the invention the magnetic member is machined from grade 430 stainless steel.

The metering head 40 is also constructed from a ferromagnetic material, preferably grade 430 stainless steel. Other ferromagnetic materials can be used to construct the magnetic member or metering head. The metering head defines an elongated portion 82 co-axial with the movable magnetic member 74 that is fixed within the housing 70 and defines a bearing surface 84 that supports the sleeve 50 for movement along a generally linear travel path in relation to the metering head 40. In addition to providing a support for the movable sleeve, the elongated portion 82 of the metering head helps define the magnetic field in the region of the solenoid coil 80. When the coil is energized by the input the magnetic field lines tend to concentrate within the elongated portion 82 as well as the moveable magnetic member 74. This concentration of field lines increases the response of the magnetic member 74 to controlled energization of the solenoid coil 80.

The metering head 40 is located near the valve inlet 32 so that refrigerant entering the valve 20 first passes through the first and second passageways 42, 44 in the metering head and then passes through the center passageway in the sleeve 50 which in turn delivers refrigerant to the valve outlet 34. The end of the metering head 40 that defines the flow passageways 42, 44 includes a generally cylindrical cavity 90 that defines part of the first passageway 42. The compressed spring 60 is supported within the cylindrical cavity 90. One end of the spring seats against an end surface 92 of the cavity and a second end of the spring seats against an end of the sleeve 50.

The metering head 40 includes a tapered tip 100 having a cone-like surface 102 facing the direction refrigerant enters the valve 20. Centered within the tapered tip 100 is a center opening 110 that is generally cylindrical and which forms part of the first passageway 42 for refrigerant flow through the valve 20. The opening 110 delivers refrigerant into the cavity 90 and then to the center passageway of the sleeve 50. Part of the refrigerant that enters the valve inlet 32 is diverted at the tip 100 of the metering head and flows around the metering head along a diverging flow path to an annular passageway 112 that extends along a length of the inlet 32. The annular passageway ends at an inwardly extending collar 114 of the inlet 32.

Refrigerant reaching the end of the annular passageway 112 enters one or more side ports 120 in the metering head. In the disclosed embodiment of the invention the metering head includes two side ports for delivering refrigerant from the annular passageway 112 into the center of the sleeve. While the disclosed embodiment has two ports 120 other numbers of ports can be used so long as a pressure imbalance does not result. As the sleeve 50 moves in response to controlled energization of the input to the solenoid, the sleeve blocks the ports 120 in the metering head and thereby reduces refrigerant flow through the valve 20 to a more restricted passage.

The disclosed solenoid is a commercially available solenoid supported within a ferromagnetic coil frame 121. In the disclosed design, the solenoid can accept input signals between 9 and 16 volts and draws no more than about 1 ampere of current while moving the sleeve to a position (FIG. 4) that blocks off refrigerant flow through the ports 120. In the resulting minimum flow configuration all refrigerant flows through the opening 110 and cavity 42 to the sleeve. In this configuration the center opening 110 controls the diameter of the refrigerant flow path resulting in the minimum flow area. As the sleeve moves to the right as depicted in FIG. 3 the ports 120 also deliver refrigerant to the sleeve and so that the combined flow through these ports combined with the flow through the opening 110 provides a maximum flow area.

A valve controller 130 is schematically depicted in FIG. 1. This controller 130 responds to sensed conditions to activate the input 66 with a signal that controls the position of the sleeve within the valve. A system requiring only a maximum and a minimum refrigerant flow requires no signal at the input for a maximum flow and a direct current energization signal (between 9 and 12 volts) when the sleeve 50 is to be moved to a position to block flow through the ports 120. Other solenoids are known that use alternating current (a.c.) energization signals. An alternate design valve could provide minimum refrigerant flow when a solenoid is de-energized and a maximum flow when energized. A more sophisticated flow control can be achieved by pulse width modulating the input 66 so that the sleeve moves back and forth within the valve 20 at the frequency of the pulse width modulated signal applied to the input. As an example, if the frequency is eight (8) hertz and the duty cycle is fifty (50%) percent, the sleeve 50 would move back and forth eight times a second and reduce the effective flow area to a valve in between the minimum and maximum values. To increase the refrigerant flow the duty cycle would be decreased so that the sleeve is in its retracted position for greater than fifty percent of the time and hence would block the ports less than one half of the time.

The controller 130 responds to various inputs to control the setting of the valve 20. As an example, the engine speed could be one criteria used to adjust refrigerant flow through the valve as the engine speed rises and falls. At low engine speed the compressor speed is also reduced and the pressure head of the refrigerant entering the evaporator drops. To increase the pressure the size of the flow passageway can be reduced in response to engine speed below a threshold for example of 850–900 rpm.

As depicted in the section view of FIG. 3, with the solenoid coil unenergized, a cone shaped end 140 of the magnetic member 74 is spaced by a gap 142 from the metering head. Attached to the cone shaped end 140 of the magnetic member 74 is an energy absorbing bumper 144 that damps noise as the solenoid is pulsed on and off to move the magnetic member 74 back and forth toward the metering head. At an opposite end 146 of the magnetic member 74 a second bumper 150 is connected to the valve outlet 34. This bumper overlies a groove 151 in the end of the outlet 34. An O-ring 152 supported in a second groove 154 in the outlet 34 prevents leakage of refrigerant from the system past an interface between the cylindrical housing 70 and the outlet 34.

With the solenoid 80 unenergized refrigerant can seep past the metering head to the gap 142. Presence of this refrigerant in the gap will pressurize the gap and such pressurization will tend to inhibit movement of the magnetic member 74 in response to solenoid energization. A groove 156 is machined in an outer surface of the magnetic member 74 from the region of the gap to the end 146 facing the bumper 150. The groove 156 extends radially inward through the body of the magnetic member 74 to a center passageway 160 that forms an extension of the passageway 52 through the sleeve 50. This groove reduces the pressure in the gap 142 and facilitates movement of the magnetic member 74 against the biasing action of the spring 60.

To assemble the valve 20, the metering head 40 and housing 70 are inserted into the valve inlet 32. The metering head rests against the collar 114 defined by the inlet 32 and the housing 70 fits between the inlet 32 and the metering head 40 against a lip 170 of the metering head 40. The inlet 32, metering head 40, and housing 70 are next welded together by means of a laser welding procedure at a necked down end 172 of the inlet 32. Other techniques for connecting these parts, such as crimping, could also be used. A next step in assembling the valve 20 is to insert the spring 60, sleeve 50 and magnetic member 74 into the housing 70. The spring fits within the cavity of the metering head 40, the sleeve 50 butts against the spring and the magnetic member 74 butts against the sleeve. Note, in the assembly configuration the spring is not compressed so the gap 142 is maintained between the magnetic member 74 and the tapered end of the metering head 40. The solenoid 80 and coil frame 121 are slipped over the housing 70 so that the frame 121 abuts the necked down end 172 of the inlet 32. Finally, the outlet is slipped into the housing 70. An additional groove 176 spaced from the groove 154 for the O-ring 152 allows an end of the housing 70 to be crimped at several radially separated locations over the outlet 34 to complete assembly of the valve 20.

While a preferred embodiment of the invention has been illustrated and described in detail the invention is not to be considered limited to the precise construction disclosed. Various adaptations, modifications and uses of the invention may occur to those skilled in the art to which the invention relates. The intention is to cover all such adaptations, modifications and uses which fall within the scope or spirit of the appended claims.

Having described our invention we claim:

1. In a refrigeration system having a compressor, evaporator, and condensor connected in series, an expansion valve connected between the evaporator and the condensor comprising:

a) a valve body having a valve inlet for accepting refrigerant and a valve outlet for delivering refrigerant through the valve body, said valve body including a metering head defining first and second passageways for fluid passing through the valve body;

b) a valving element mounted for controlled movement within the valve body and including a valving element passageway which in combination with the first and second passageways conveys fluid through the valve body to the valve outlet; and c) a valve actuator mounted to the valve body for moving the valving element to a position blocking flow through one passageway of the first and second passageways while allowing fluid to flow through another of the first and second passageways and said valve element passageway to the outlet.

2. The system of claim 1 wherein the valving element comprises an elongated sleeve having a center passageway through which refrigerant flows to the outlet of the valve body.

3. The system of claim 1 wherein the metering head is located near the valve inlet and the first and second passageways in the metering head deliver refrigerant from the metering head to the valve element passageway in the valving element which in tun delivers refrigerant to the valve outlet.

4. The system of claim 1 wherein the valve body defines a generally cylindrical body portion and the valve actuator comprises a movable magnetic member coupled to the valving element which is supported within the cylindrical body portion of the valve body for back and forth movement; and further comprising a solenoid coil that is coupled to a control input responsive to an external control signal to control positioning of the valving element, wherein the solenoid coil sets up a magnetic field in the region of the moveable magnetic member.

5. The system of claim 4 further comprising a second magnetic member co-axial with said movable magnetic member and fixed to the valve body and defining a bearing surface supporting the valving element for movement along a generally linear travel path in relation to the metering head.

6. The system of claim 1 wherein the metering head includes a generally cylindrical cavity forming part of the first passageway and additionally comprising a biasing member supported within the cylindrical cavity of the metering head for biasing the valving element away from the metering head.

7. The system of claim 6 wherein the biasing member comprises a spring attached at one end to the valving element and wherein an opposite end of the spring is seated against a base portion of the metering head.

8. The system of claim 6 wherein the first passageway passes through a tip of the metering head and opens outwardly into the cylindrical cavity in the metering head.

9. The system of claim 8 wherein the valving element comprises a sleeve having a center passageway that aligns co-axially with the cylindrical cavity in the metering head.

10. The system of claim 4 further comprising a control circuit for energizing the control input with a pulse width modulated signal of constant frequency.

11. A method for delivering a refrigerant from a high pressure region to a low pressure region of a refrigeration system through a variable dimension passageway to allow the refrigerant to expand as it enters the low pressure region comprising the steps of:
 a) coupling the high and low pressure regions through a valve body having a refrigerant inlet and a refrigerant outlet and a metering head defining first and second passageways for fluid passing through the valve body;
 b) mounting a sleeve having a center passageway for controlled movement within the valve body so that refrigerant passing through the first and second passageways of the metering head also passes through the center passageway of the sleeve before said refrigerant reaches the refrigerant outlet of the valve body;
 c) biasing the sleeve in a direction relative the metering head to maintain both the first and second passageways in fluid communication with the center passageway of the device; and
 d) selectively moving the sleeve against the biasing action applied in step (c) to block flow through one passageway of the first and second passageways while allowing continued refrigerant flow through another of the first and second passageways to reach the refrigeration outlet.

12. The method of claim 11 wherein the step of selectively moving the sleeve against the biasing action is conducted at regular intervals and for a controlled percentage of time.

13. The method of claim 11 wherein the step of moving the sleeve totally blocks flow through the one passageway.

14. A refrigeration expansion valve comprising:
 a) a valve body having a valve inlet for accepting refrigerant and a valve outlet for delivering refrigerant through the valve body, said valve body including a metering head defining first and second passageways for fluid passing through the valve body;
 b) a valving element mounted for controlled movement within the valve body and including a valving element passageway which in combination with the first and second passageways conveys fluid through the valve body to the valve outlet; and
 c) a valve actuator mounted to the valve body for moving the valving element to a position blocking flow through one passageway of the first and second passageways while allowing fluid to flow through another of the first and second passageways and said valve element passageway to the outlet, said valve actuator including a control input responsive to an external control signal to control positioning of the valving element.

15. The refrigeration expansion valve of claim 14 wherein the valve actuator comprises a solenoid for setting up a magnetic field and a magnetic member mounted for movement within the valve body and wherein the valving element comprises a sleeve attached to said magnetic member for movement in relation to the metering head to block fluid flow through one of said first and second passageways.

16. The system of claim 1 wherein said valve actuator includes a control input responsive to an external control signal to control positioning of the valving element.

17. The system of claim 17 further comprising a biasing member for urging the valving element to a position allowing maximum fluid flow through the first and second passageways of the valving element and wherein the valve actuator moves the valving element away from said position in response to control signals at the control input.

18. The system of claim 1 wherein said metering head defines an interior cavity and said first and second passageways in the metering head enter the interior cavity in directions that are transverse with respect to each other.

19. The system of claim 1 wherein one of said first and second passageways in the metering head is disposed co-axially with said valving element passageway.

20. The method of claim 11 wherein refrigerant passing through said first passageway moves in a transverse direction with respect to refrigerant passing through said second passageway.

21. The method of claim 11 wherein refrigerant passing through one of said first and second passageways moves in a co-axial direction with respect to refrigerant passing through the center passageway in said sleeve.

22. The expansion valve of claim 14 wherein said metering head defines an interior cavity and said first and second passageways in the metering head enter the interior cavity in substantially perpendicular directions.

23. The system of claim 14 wherein one of said first and second passageways in the metering head is disposed co-axially with said valving element passageway.

24. In a refrigeration system having a compressor, evaporator, and condensor connected in series, an expansion valve connected between the evaporator and the condensor comprising:
 a) a valve body having a valve inlet for accepting refrigerant and a valve outlet for delivering refrigerant through the valve body, said valve body including a metering head defining first and second passageways for refrigerant passing through the valve body, wherein the metering head includes a generally cylindrical cavity forming part of the first passageway and said first passageway passes through a tip of the metering head and opens into said cylindrical cavity;
 b) a valving element mounted for controlled movement within the valve body and including a valving element passageway which in combination with the first and second passageways conveys refrigerant through the valve body to the valve outlet, said valving element comprising a sleeve defining a center passageway co-axially aligned with the cylindrical cavity in the metering head;
 c) a biasing member supported within said cylindrical cavity for biasing the valving element away from the metering head; and
 d) a valve actuator mounted to the valve body for moving the valving element to a position for restricting refrigerant flow through one of said first and second passageways while allowing refrigerant flow through the other of said first and second passageways and said valve element passageway to the outlet, said valve actuator including a control input responsive to an external control signal to control positioning of the valving element.

25. The system of claim 24 wherein the biasing member is a spring.

26. The system of claim 24 wherein the valving element is secured to a movable magnetic member and the valve actuator includes a coil energized by said control input to move the movable magnetic member and shift the valving element to said position.

27. In a refrigeration system having a compressor, evaporator, and condensor connected in series, an expansion valve connected between the evaporator and the condensor comprising:

a) a valve body having a valve inlet for accepting refrigerant and a valve outlet for delivering refrigerant that has passed through the valve body, said valve body including a metering head that defines first and second passageways for refrigerant passing through the valve body;

b) a valving element mounted for controlled movement within the valve body and including a valving element passageway which in combination with the first and second passageways conveys refrigerant through the valve body to the valve outlet when the valving element is in a first position; and c) a valve actuator mounted to the valve body for moving the valving element to a second position for substantially blocking refrigerant flow through one of said first and second passageways while allowing refrigerant flow through the other of said first and second passageways and said valve element passageway to the outlet, said valve actuator including a control input responsive to an external control signal of variable duration to control positioning of the valving element by repeatedly moving the valving element between said first and second positions.

28. The system of claim 27 wherein the external control signal of variable duration is a pulse width modulated control signal.

29. The system of claim 28 wherein said pulse width modulated control signal controls positioning of the valving element by repeatedly moving the valving element between said first and second positions at a desired frequency to obtain a selected refrigerant flow rate which is between flow rates respectively provided by said first and second position of said valving element.

30. The system of claim 27 wherein said valving element is a sleeve and said external control signal controls positioning of the sleeve by repeatedly moving the sleeve between said first and second positions.

31. A method for delivering a refrigerant from a high pressure region to a low pressure region of a refrigeration system through a variable dimension passageway to allow the refrigerant to expand as it enters the low pressure region, the method comprising steps of:

a) coupling the high and low pressure regions through a valve body having a refrigerant inlet and a refrigerant outlet and a metering head that defines first and second passageways for refrigerant passing through the valve body;

b) mounting a sleeve having a center passageway for controlled movement within the valve body between a first position in which refrigerant passes through the first and second passageways of the metering head and through the center passageway of the sleeve to reach the refrigerant outlet of the valve body, and a second position in which refrigerant flow is restricted through one of said first and second passageways but permitted through the other of said first and second passageways and through the center passageway of the sleeve to reach the refrigeration outlet of the valve body;

c) biasing the sleeve in a direction relative the metering head to said first position to maintain both the first and second passageways in fluid communication with the center passageway of the sleeve; and d) applying an external control signal of variable duration to reciprocate the sleeve against said biasing between said tint and second positions to control the flow of refrigerant to the refrigeration outlet.

32. The method of claim 31 wherein the external control signal of step d) is a pulse width modulated control signal that reciprocates the sleeve against said biasing between said tint and second positions to control the flow of refrigerant to the refrigeration outlet.

33. The method of claim 32 wherein said pulse width modulated signal reciprocates said sleeve between said first and second positions at a desired frequency to obtain a selected refrigerant flow rate which is between flow rates respectively provided by said first and second positions of the sleeve.

* * * * *